US007788081B1

(12) United States Patent
Kreiner et al.

(10) Patent No.: US 7,788,081 B1
(45) Date of Patent: Aug. 31, 2010

(54) METHOD OF COMMUNICATING DATA FROM VIRTUAL SETTING INTO REAL-TIME DEVICES

(75) Inventors: Barrett M. Kreiner, Woodstock, GA (US); Steven A. Wright, Roswell, GA (US); Christian Kuhtz, Roswell, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 711 days.

(21) Appl. No.: 11/473,342

(22) Filed: Jun. 22, 2006
(Under 37 CFR 1.47)

(51) Int. Cl.
*G06F 9/45* (2006.01)

(52) U.S. Cl. .............................. 703/22; 463/41; 463/42; 340/323 R

(58) Field of Classification Search .................... 703/21, 703/22
See application file for complete search history.

(56) References Cited

U.S. PATENT DOCUMENTS

| 5,942,969 | A | * | 8/1999 | Wicks .................... 340/286.02 |
| 6,139,433 | A | | 10/2000 | Miyamoto et al. |
| 6,215,498 | B1 | * | 4/2001 | Filo et al. .................... 345/419 |
| 6,315,668 | B1 | * | 11/2001 | Metke et al. .................. 463/42 |
| 6,320,495 | B1 | * | 11/2001 | Sporgis .................. 340/323 R |
| 6,354,948 | B1 | * | 3/2002 | Nagayama .................... 463/43 |
| 6,527,641 | B1 | * | 3/2003 | Sinclair et al. ................. 463/39 |
| 7,086,005 | B1 | * | 8/2006 | Matsuda ...................... 715/706 |
| 7,265,663 | B2 | | 9/2007 | Steele |
| 7,396,281 | B2 | | 7/2008 | Mendelsohn et al. |
| 7,435,179 | B1 | * | 10/2008 | Ford ............................. 463/42 |
| 7,464,337 | B2 | * | 12/2008 | Han et al. .................... 715/738 |
| 7,584,124 | B2 | * | 9/2009 | Porat et al. ..................... 705/26 |
| 2002/0052724 | A1 | | 5/2002 | Sheridan |
| 2002/0090985 | A1 | * | 7/2002 | Tochner et al. ................. 463/1 |
| 2002/0138587 | A1 | | 9/2002 | Koehler et al. |
| 2002/0184255 | A1 | | 12/2002 | Edd et al. |
| 2003/0055984 | A1 | * | 3/2003 | Shimakawa et al. ......... 709/227 |
| 2003/0059005 | A1 | * | 3/2003 | Meyerson et al. ........ 379/88.17 |
| 2003/0177187 | A1 | * | 9/2003 | Levine et al. ............... 709/205 |
| 2004/0109023 | A1 | * | 6/2004 | Tsuchiya .................... 345/758 |
| 2004/0219961 | A1 | * | 11/2004 | Ellenby et al. ................. 463/1 |
| 2005/0004984 | A1 | * | 1/2005 | Simpson ..................... 709/205 |
| 2005/0207617 | A1 | | 9/2005 | Sarnoff |
| 2006/0079330 | A1 | * | 4/2006 | Dvorak et al. ................. 463/42 |
| 2007/0149286 | A1 | * | 6/2007 | Bemmel ....................... 463/41 |
| 2007/0260687 | A1 | * | 11/2007 | Rao et al. .................... 709/204 |

OTHER PUBLICATIONS

Bartlett et al, "Using Games as a Means for Collaboration", Proceedings of the 11th International Multimedia Modelling Conference, Jan. 12-13, 2005.*
Rashid et al, "Extending Cyberspace: Location Based Games Using Cellular Phones", ACM Computers in Entertainment, vol. 4, No. 1, Jan. 2006.*

(Continued)

*Primary Examiner*—Mary C Jacob
(74) *Attorney, Agent, or Firm*—Scott P. Zimmerman, PLLC

(57) ABSTRACT

A method of communicating data from a virtual setting to a real-time communication device includes launching a simulation program on a computing device, activating a communication object within the simulation program, selecting data from the simulation program and submitting the selected data to the real-time communication device over a communication link wherein a communication address is associated with the computing device.

17 Claims, 3 Drawing Sheets

OTHER PUBLICATIONS

Tavares et al, "Hyperpresence-An Application Environment for Control of Multi-User Agents in Mixed Reality Spaces", Proceedings of the 36th Annual Simulation Symposium, Mar. 30-Apr. 2, 2003.*

Wadley et al, "Towards a Framework for Designing Speech-Based Player Interaction in Multiplayer Online Games", Proceedings of the 2nd Australian Conference on Interactive Entertainment, Nov. 2005.*

Halloran et al, "Does It Matter If You Don't Know Who's Talking? Multiplayer Gaming with Voiceover IP", Conference on Human Factors in Computing Systems, 2004.*

Gord Goble, "F1 Challenge '99-'02", GamesSpot, pp. 1-4, Nov. 12, 2003.

Blackhole Motorsports, www.bhmotorsports.com/NT2004/screenshots/7571, Sep. 23, 2003 (Date determined by WayBackMachine at www.archive.org), pp. 1-2.

"NBA Live 2003 review" by G. Varanini, Nov. 27, 2002, GameSpot, 3 pages.

* cited by examiner

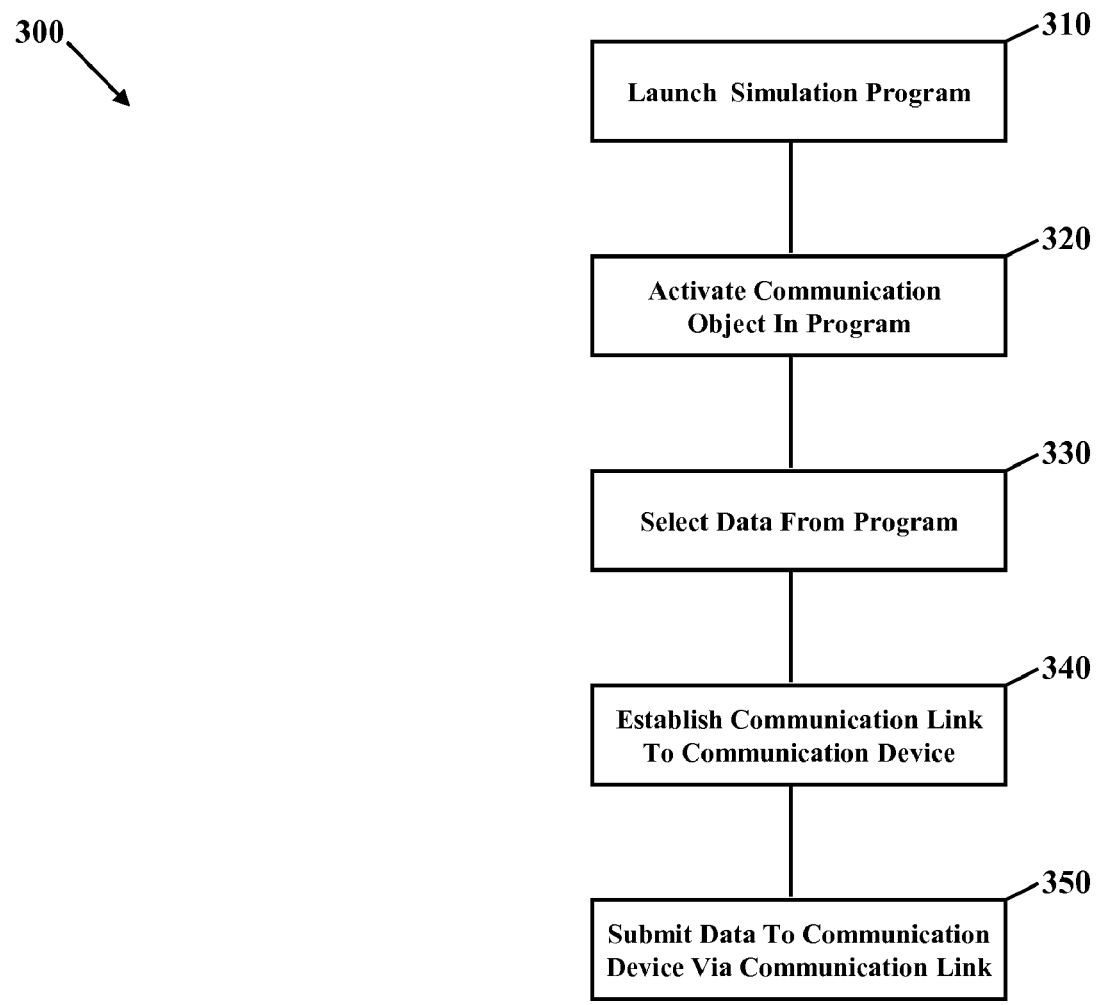

METHOD OF COMMUNICATING DATA FROM VIRTUAL SETTING INTO REAL-TIME DEVICES

RELATED APPLICATIONS

This application is related to the following concurrently filed applications: U.S. application Ser. No. 11/472,799, entitled "Method of Implementing Real Time Data into Virtual Settings" by Barrett Kreiner, Steven Wright and Christian Kuhtz; and U.S. application Ser. No. 11,472,810, "Adaptive Access In Virtual Settings Based On Established Virtual Profile" by Barrett Kreiner, Steven Wright, Christian Kuhtz, Samuel Zellner and Robert Starr. The Subject matter of each of these applications in their entirety is incorporated herein by reference.

BACKGROUND

This invention relates to simulation and other virtual settings and more particularly to communicating data from virtual setting into real-time devices.

Gaming devices are well known. Gaming can be viewed as a form of simulation. The early versions of games in a gaming device attached to a television monitor or played on a personal computer consisted of simple games like 'pong' in which a player played against the computer. As more powerful processors became available in personal computers, games having more complex features were developed. These games permitted participation by multiple players for example.

The more powerful processors also enabled the use of graphics within the games. Graphics provide a more elaborate and lifelike background or user interface. Participants in some computer games or simulated sporting events (such as boxing for example) may be represented by a graphical representation so that a participant's action can be replicated or presented on the display. The effect of one participant's action on another participant may similarly be displayed. As a result, the gaming experience has become more realistic and personal.

The advent of networks has added another dimension to the gaming experience. It is now possible for participants at different physical locations to engage in a game over a network such as the interne for example. Thus, there is no longer a geographic limitation to the participant's location—they can be in the next room or on another continent.

Games (or other type of simulation programs) for execution on a computing device are developed or created and implemented as executable code on a computer-readable medium. The computer-readable medium may be a compact disc for example. The various scenarios encountered in a game are preprogrammed or programmed to respond in a pre-defined way to a particular action by a participant.

As the line that separates the virtual world from the real world continues to blur with enhanced technology, there has arisen a need to facilitate communication of data between these two settings.

SUMMARY

In one embodiment, a method for communicating data from a virtual setting to a real-time communication device comprises launching a simulation program on a computing device, activating a communication object within the simulation program, selecting data from the simulation program and submitting the selected data to the real-time communication device over a communication link. A communication address is associated with the computing device.

In another embodiment, a system for communicating data from a virtual setting to a real-time communication device comprises a computing device executing a simulation program and an object included in the simulation program. An activation of the object establishes a communication link from the computing device to a real-time communication device over a network for communicating data to the real-time communication device.

In yet another embodiment, a computer-readable medium contains a computer program for communicating data from a virtual setting to a real-time device. The computer program, when executed on a computing device, causes the computing device to launch a simulation program on the computing device, activate a communication object within the simulation program, select data from the simulation program and submit the selected data to the real-time device over a communication link wherein a communication wherein a communication address is associated with the real-time device.

BRIEF DESCRIPTION OF THE DRAWINGS

The various features, advantages, and objects of this invention will be understood by reading this description in conjunction with the drawings, in which:

FIG. 3 illustrates an exemplary method for providing data from a virtual setting to a real-time device.

DETAILED DESCRIPTION

Figure 1:
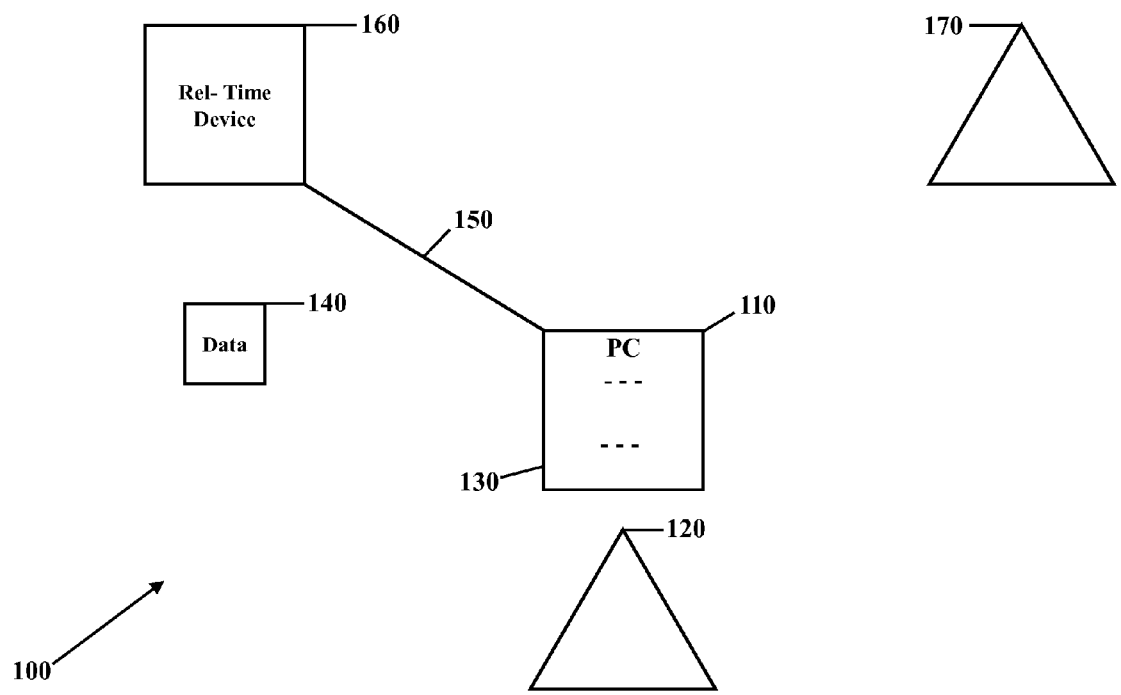
FIG. 1 illustrates a system according to an exemplary embodiment.

The following description of the implementations according to exemplary embodiments refers to the accompanying drawings. The same reference numbers in different drawings identify the same or similar elements. The following detailed description does not limit the invention. Instead, the scope of the invention is defined by the appended claims.

According to exemplary embodiments, a simulated event executes on a computing device. Specifically, data from the simulated event in virtual space is communicated to a real-time device.

The various outcomes or scenarios encountered in the course of playing a game (or a simulation program) are pre-programmed or programmed to reflect a participant's actions. The various outcomes resulting from such participant actions may be saved only within the software application representing the game. In some games, a spectator mode may be available. The spectator may be able to navigate within the virtual (i.e., game) setting as a normal participant but cannot control the virtual resources. The outcomes encountered in a game may be represented by data. The data, therefore, is available only within the application (gaming or simulation).

In a computer game simulating a treasure hunt for example, the status of items included in the treasure hunt (that are to be found) may be maintained within the game. The status may be "discovered" (D) or "not discovered" (ND). At the onset of the games, all items included in the treasure may have the ND status. As a particular item is discovered, the item's status changes to D.

Gaming or simulation programs also facilitate interaction between multiple participants engaging in the same game or simulation. In some situations, the participants may be at different locations each engaging in the game on his or her computing device and interact with each other over a network. During the game, participants may communicate with each other via messaging over the network (in addition to telephone, etc.). They may also communicate via headsets and the conversation may be carried over the network utilizing known techniques (voice-over-IP or VoIP for example). The environment they operate in, however, is limited to the game being played on computing devices on which the game is being played.

As the line that separates the virtual world from the real world continues to blur with enhanced technology, it becomes necessary to facilitate communication of data between these two settings. A method for communicating data from a real setting to a virtual setting is been described in the concurrently filed application entitled "Method of Implementing Real Time Data into Virtual Settings", herein incorporated by reference.

Exemplary embodiments communicate data from a virtual setting such as a gaming or simulation program (i.e., virtual data) to a real-life setting (i.e., real-time data). Data from a virtual setting may therefore be communicated to devices that are not participating in the game or the simulation. Most commercial multiplayer games follow a client-server architecture where local (i.e., client specific) state information may be available in the client computer and global state information may be available in or at the server.

Referring to the treasure hunt example cited earlier, such a game can be based on a physical treasure hunt taking place in a public area such as a park. The simulation on a computer may be based on re-creating a virtual representation of the park along with location and description (e.g. graphical) of the items constituting the treasure hunt. The treasure hunt may commence with a team having at least one virtual participant (i.e. on a computer) and at least one physical participant (teammate) in the park. As the virtual participant locates an item, such information may be communicated to real-time device associated with the physical participant. The real-time device is not participating in the simulation.

A system 100 according to an exemplary embodiment may be illustrated with reference to FIG. 1. A computing device 110 may include a gaming or simulation program 130. A participant 120 may launch application 130 on the computing device. Data 140 from application 130 may be communicated via a network 150 to a real-time device 160. Network 150 may be the internet for example. Real-time device 160 may be associated with an individual 170. Computing device 110 may be a personal computer (PC), a laptop computer, a personal digital assistant (PDA), a gaming console, or other similar devices. The game may be displayed on a monitor.

Figure 2:
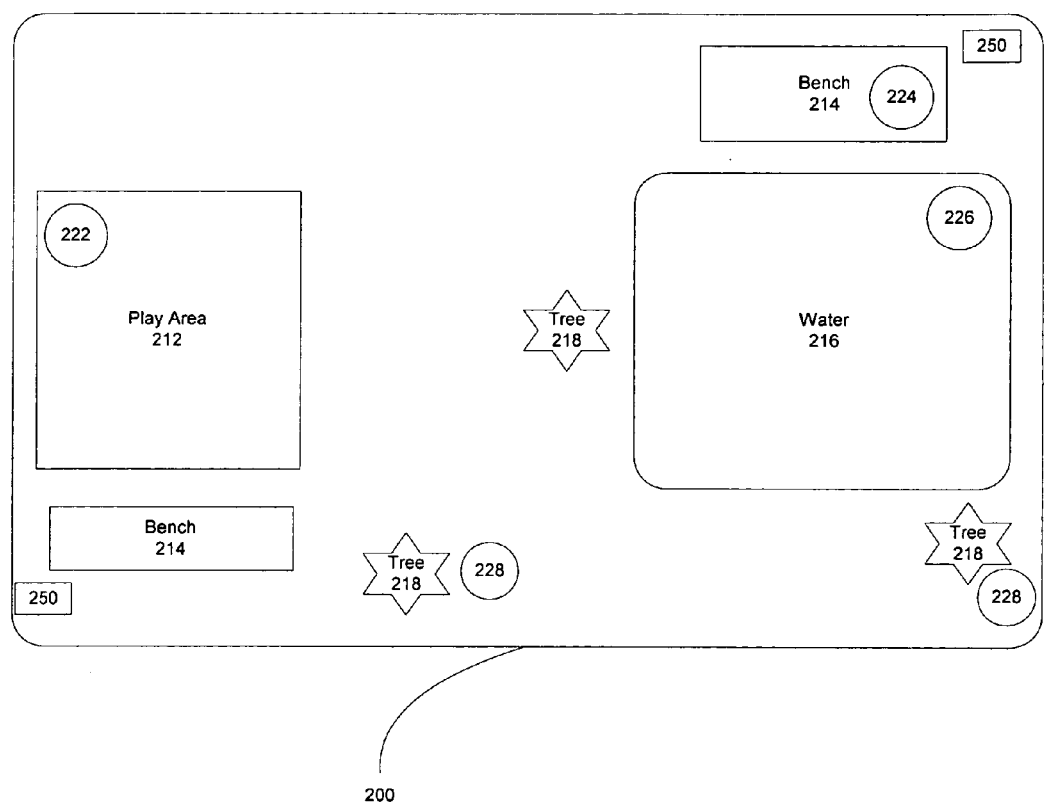
FIG. 2 illustrates an exemplary motorway utilized for an automobile race.

Participant 120 may invoke an object within application 130 to initiate the communication with real-time device 160. A user interface for an exemplary application may be illustrated in FIG. 2. The object being invoked for initiating communication may be represented by a generic icon (i.e. generic to all such applications). Referring to FIG. 2, a treasure hunt simulation interface 200 (i.e. a park in this example) may include a plurality of icons representing features of a park such as play area 212, benches 214, water 216, trees 218, etc. A plurality of icons 222-228 may represent the various items to be found within the virtual park 200. A generic icon 250 for initiating communication may be located within user interface in more than one location for example. The icon may represent a virtual telephone.

As the game commences in the virtual setting, a participant may locate item 224. A team-mate may be taking part in the physical setting at the same time. The participant in the virtual setting may communicate the location or discovery of item 224 to the team mate. Icon 250 may be activated by, for example, dialling a phone number associated with the team mate having a real-time device. The team mates may then communicate vocally as if using a telephone via VoIP for example.

Similarly, status or updates from the virtual setting may be communicated as data to a real-time device 160. Real-time device 160 may be a cellular phone, a pager, a PDA with phone capability such as a Blackberry® or Treo® devices, etc. Data may be submitted as an e-mail attachment, a text message, etc. The game or simulation program may be programmed to send state information (from the virtual setting) to an external device. Such information may be the program sending an e-mail based on a triggering event; or, a stream of data samples reflecting the current game state. Most multiplayer games include frame time or cycle time that provide the time granularity within which the actions of the multiple players are synchronized. The frame rate may form a sampling rate. The game may also be programmed to provide updates as data to a recipient device upon icon 250 being activated for example.

While the description of exemplary embodiments has focused on communicating data from a participant in a virtual setting to a team mate in a physical setting, the invention is not limited to such a setup. Updates may be provided to others that are interested in knowing how a game or simulation is progressing. The data being communicated is also not limited to the progression of a game. A participant may wish to communicate with a family member while engaging in the game. Such communication may include informing the family member of a time at which the participant expects to meet the family member, etc. The game interface 200 provides an alternative to communicating by picking up a physical phone (including a cell phone) and dialling a number.

As described in the co-pending application, data from a real-time device 160 can also be communicated to computing device 110. Real-time device typically has a phone number or other similar type of identification. The identification may be an internet protocol (IP) address if the real-time device is connected to a network. Similarly, computing device 110 may also have an associated identification such as an IP address.

An exemplary method 300 may be described with reference to FIG. 3. A participant or player may launch (or, execute) a gaming application on a computing device at 310. The communication object within the gaming or simulation interface (icon 250 for example) may be activated at 320. Data from the executing program may be selected at 330. A communication link may be established between the computing device a real-time device at 340. The selected data is then submitted to the real-time device via the established communication link at 350.

Communication between the computing device 110 and the real-time device 160 may take place over a secure connection on a public network such as the internet or over a dedicated connection. A secure connection may also be used.

Exemplary embodiments can be within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. The computer-readable medium can be, for example but not limited to, an electronic, magnetic, optical, electromagnetic, infrared, or semiconductor system, apparatus, and/or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

It is expected that this invention can be implemented in a wide variety of environments. For example, principles of this invention can be used to provide updates on games or simulations taking place in a virtual gaming tournament. Communication may also take place to a plurality of real-time devices.

It will also be appreciated that procedures described above are carried out repetitively as necessary. To facilitate understanding, aspects of the invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

It is emphasized that the terms "comprises" and "comprising", when used in this application, specify the presence of stated features, integers, steps, or components and do not preclude the presence or addition of one or more other features, integers, steps, components, or groups thereof.

Thus, this invention may be embodied in many different forms, not all of which are described above, and all such forms are contemplated to be within the scope of the invention. The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of communicating data from a virtual setting to non-participants, the method comprising:
    launching a simulation program on a computing device;
    determine a status of an item in the simulation program as discovered or not discovered;
    activating a communication object within the simulation program;
    retrieving the status of the item; and
    sending the status of the item as a text message to a communication device not participating in the simulation program.

2. The method of claim 1, wherein the computing device is one of a personal computer, a laptop computer, a personal digital assistant or a gaming console.

3. The method of claim 1, wherein the status of the object comprises a status of a hunted object in a treasure hunt.

4. The method of claim 1, wherein the communication object is represented by an icon within a user interface corresponding to the simulation program.

5. The method of claim 1, wherein the communication device is one of a telephone, a cell phone, a pager and a personal digital assistant having communication capability.

6. The method of claim 5, wherein the communication device has an associated identification.

7. The method of claim 6, wherein the communication object is provided with the identification of the communication device.

8. The method of claim 7, wherein the identification of the communication device is an IP address.

9. The method of claim 1, further comprising sending the status of the object to a communications network.

10. A system for providing data from a virtual setting to a real-time setting, the system comprising:
    a computing device executing a simulation program, the simulation program determining a status of an item as discovered or not discovered, the computing device sampling the simulation program according to a frame rate; and
    an object included in the simulation program, wherein an activation of the object sends a text message over a network from the computing device to a real-time communication device that is not a participant in the simulation program, the text message comprising the status of the item as discovered or not discovered.

11. The system of claim 10, wherein the computing device is a personal computer.

12. The system of claim 10, wherein the simulation program is a computer program having a corresponding live event.

13. The system of claim 10, wherein the communication device is one of a telephone, a cell phone or a personal digital assistant having a communication capability.

14. The system of claim 13, wherein the communication device has an identification.

15. The system of claim 14, wherein the identification includes at least one of a phone number or an internet protocol (IP) address.

16. The system of claim 10, wherein the network is a public network accessible via a secure connection.

17. A computer-readable storage medium containing a computer program for communicating data from a virtual setting to a real-time device, the computer program, when executed on a computing device, causes the computing device to:
    launch a simulation program on a computing device that samples the simulation program according to a frame rate;
    determine a status of an item in the simulation program as discovered or not discovered;
    activate a communication object within the simulation program;
    select data from the simulation program;
    send a text message comprising the status of the item over a network from the computing device to a real-time communication device that is not a participant in the simulation program; and
    send a stream of data samples reflecting a status of the simulation program to the real-time communication device.

* * * * *